US005692017A

United States Patent [19]

Shiokawa

[11] Patent Number: 5,692,017

[45] Date of Patent: Nov. 25, 1997

[54] RECEIVING CIRCUIT

[75] Inventor: Toshimichi Shiokawa, Tokyo, Japan

[73] Assignee: NEC Corporation, Japan

[21] Appl. No.: 504,513

[22] Filed: Jul. 20, 1995

[30] Foreign Application Priority Data

Jul. 20, 1994 [JP] Japan .................................... 6-189054

[51] Int. Cl.$^6$ ................................ H04M 1/74; H04L 1/00

[52] U.S. Cl. ............................ 375/346; 375/254; 381/56; 381/94; 395/2.23; 395/2.42

[58] Field of Search .................................... 375/244, 254, 375/346, 348; 381/56, 94; 395/2.23, 2.24, 2.35, 2.37, 2.42; 455/67.3; 327/72–73

[56] References Cited

U.S. PATENT DOCUMENTS

| | | | |
|---|---|---|---|
| 4,426,727 | 1/1984 | Hamada | 381/13 |
| 4,700,392 | 10/1987 | Kato et al. | 395/2.42 |
| 4,918,734 | 4/1990 | Muramatsu et al. | 395/2.23 |
| 5,295,225 | 3/1994 | Kane et al. | 395/2.35 |
| 5,327,461 | 7/1994 | Kushige | 375/244 |
| 5,485,522 | 1/1996 | Sölve et al. | 381/56 |
| 5,499,318 | 3/1996 | Kopp et al. | 395/2.82 |
| 5,539,858 | 7/1996 | Sasaki et al. | 395/2.21 |

*Primary Examiner*—Young T. Tse
*Attorney, Agent, or Firm*—Ostrolenk, Faber, Gerb & Soffen, LLP

[57] ABSTRACT

A receiving circuit has an automatic level setting function for a background noise on the receiver side to generate a background noise free from incongruous aural sensation. This circuit is equipped with a voice/silence unit which detects whether a received signal is in a voice or a voiceless state, a signal level detection unit which detects the signal level of the received signal, a background noise unit which outputs a background noise, a selector which selects and outputs the received signal during the voiced period and the output signal of the background noise unit during the voiceless period, a level holding unit which holds the signal level output at the preceding sampling timing detected by the signal level detection unit, and a comparison unit which compares the present signal level output of the signal level detection unit and the preceding signal level output held in the holding unit, the background noise signal being thus obtained, by adding or subtracting a predetermined specified noise level to or from, or by giving any change to, the preceding background noise signal.

4 Claims, 3 Drawing Sheets

RECEIVING CIRCUIT

BACKGROUND OF THE INVENTION

1. Field of the Invention

The present invention relates to a receiving circuit and, more particularly, to a receiving circuit having the function of inserting a background noise. Such a circuit is applied widely to a digital cordless telephone set, employing an adaptive differential pulse-code modulation (ADPCM) codec or the like.

2. Description of the Prior Art

In a receiving circuit of the above kind, when the signal level is brought to zero during a voiceless (silent) period, speech becomes to lose natural sensation due to sudden disappearance of the background noise. To remedy the situation, a background noise is inserted to the receiving circuit during the voiceless period.

Referring to FIG. 3, there is shown the configuration of an internal automatic level setting circuit for the background noise on the receiver side in a conventional cordless telephone set. This circuit includes a voice/silence detection circuit 1 which detects whether a received speech signal 101 belongs to a voiced or a voiceless state, a signal level detection circuit 2 which detects the signal level of the received speech signal 101 at specified timings, a background noise generating circuit 6, and a switch or selector 7 from which an audio signal 108 is derived. The received speech signal 101 is input in common to the voice/silence detection circuit 1, the signal level detection circuit 2, and the selector 7.

The circuit 1 observes the conditions of the received speech signal 101 and outputs a voice/silence detection signal 103 which is at a high level (high potential) when the received speech signal is voiced and is at a low level (low potential) when it is voiceless. This 103 is supplied in common to the signal level detection circuit 2 and the selector 7.

The circuit 2 detects the signal level of the received speech signal 101 at the timing (referred to as "background noise level update timing") of transition of the voice/silence signal 103 from the high level to the low level, outputs a detected level signal 102 which has a magnitude or amplitude proportional to the detected signal level, where the detected level signal 102 is input to the background noise generating circuit 6. The circuit 6 generates and outputs an internal background noise signal 107 which is a background noise that is proportional to the amplitude of the detected level signal 102. This noise signal 107 is in turn supplied to the selector 7. In response to the detection signal 103, the selector 7 selects the received speech signal 101 when the signal 103 is at the high level (namely, when it is voiced), and selects the internal background noise signal 107 when the voice/silence decision signal 103 is at the low level (namely, when it is voiceless), and outputs the selected signal as the audio signal 108.

As described in the above, in the prior art, the signal level of the received speech signal 101 is detected at the timing of transition of the received speech signal 101 from voiced to voiceless condition, and a background noise with a level corresponding to the level of the detected signal is regenerated and is inserted to the receiver circuit during the voiceless period as an audio signal 108. By so doing, an unnatural sensation generated due to the difference in the levels of the background noise during the voiced period and the voiceless period, which becomes a problem in such a case as the insertion of a background noise of a fixed level to the receiving circuit during the voiceless period, is arranged to be eliminated. The prior art as shown in FIG. 3 is applied preferably to a digital cordless telephone set, in particular, to an ADPCM codec or the like.

However, in the prior art as shown in FIG. 3, the background noise proportional to the detected signal level is regenerated at every background noise level update timing, so that when an impulse noise or the like is generated at that timing, a background noise proportional to the level of the impulse noise is created, generating an unnatural background noise which gives rise to an aurally incongruous sensation such as one caused by a sudden change in the background noise.

SUMMARY OF THE INVENTION

It is therefore an object of this invention to eliminate the above-mentioned problem, and to provide, a receiving circuit which can generate a background noise free from incongruous aural sensation.

A receiving circuit according to the present invention comprises a voice/silence detection circuit detecting whether a received speech signal is in a voiced or a voiceless state, a signal level detection circuit detecting the signal level of the received signal, a background noise generator generating a background noise signal, a selector selecting the received signal during a voice period and selecting and outputting the output signal of the background noise signal during a voiceless period, a holding circuit holding the signal level output of the preceding sampling detected by the signal level detection circuit, and a comparator for comparing the output of the signal level detection circuit with the signal level output at the preceding timing held by the holding circuit. The background noise outputting means is so controlled as to output a background noise signal having a level obtained by adding to or subtracting from the background noise level at the preceding timing a specified noise level determined in advance in response to the comparison result of the comparator.

This invention is characterized in that it is provided with a means which, in response to the comparison result, controls the background noise outputting means to output a background noise so as not to deviate from the background noise level at the preceding timing by more than a specified level.

Moreover, it is preferable in this invention to have a means which controls so as to output the background noise level as it is when the difference between the present signal level output of the signal level detection means and the output of the signal level held in the detected level holding means falls within the range of the level defined by predetermined upper and lower limits, output a background noise with a level lower by a specified amount than the background noise level at the preceding timing when the difference is smaller than the lower limit, and output a background noise with a level higher by a specified amount than the background noise level at the preceding timing when the difference is greater than the upper limit.

Furthermore, it is preferable in this invention that the detected level holding means holds the signal level output ((n-l)th sample) of the signal level detection means at the timing where the decision output of the voice/silence decision means of the received signal makes a transition from a voiced to a voiceless state, and the comparison means outputs the difference between the present signal level output (n-th sample) of the signal level detection means and the signal level output ((n-l)th sample) held in the detected level holding means as the comparison result.

In an ADPCM codec equipped with an internal automatic level setting circuit for the receiver side background noise, consisting of a circuit for deciding whether the received signal is in a voiced or a voiceless state, a circuit for detecting the signal level of the received speech signal, a background noise generating circuit for outputting a background noise, and a switch for selecting the received speech signal or the background noise generated by the background noise generating circuit as an aural signal, this invention provides an ADPCM codec which is characterized in that it is equipped with a means for comparing the present sample value with the sample value at the preceding timing, of the level of the received speech signal, and a means for controlling the background noise generating circuit so as to output the present background noise which does not deviate from the background noise level of the preceding sampling by more than a specified amount.

With the above-mentioned configuration, the level change in the background noise regenerated on the receiver side is contained within a range specified in advance, so that this invention is capable of providing a background noise free from incongruous aural sensation by restricting the deviation of the present level of the background noise from the level of the preceding sampling only by one step even when an impulse noise is generated at the time of updating the background noise level.

BRIEF DESCRIPTION OF THE DRAWINGS

The above-mentioned and other objects, features, and advantages of this invention will become more apparent by reference to the following detailed description of the invention taken in conjunction with the accompanying drawings, wherein.

DESCRIPTION OF THE PREFERRED EMBODIMENT

Figure 1:
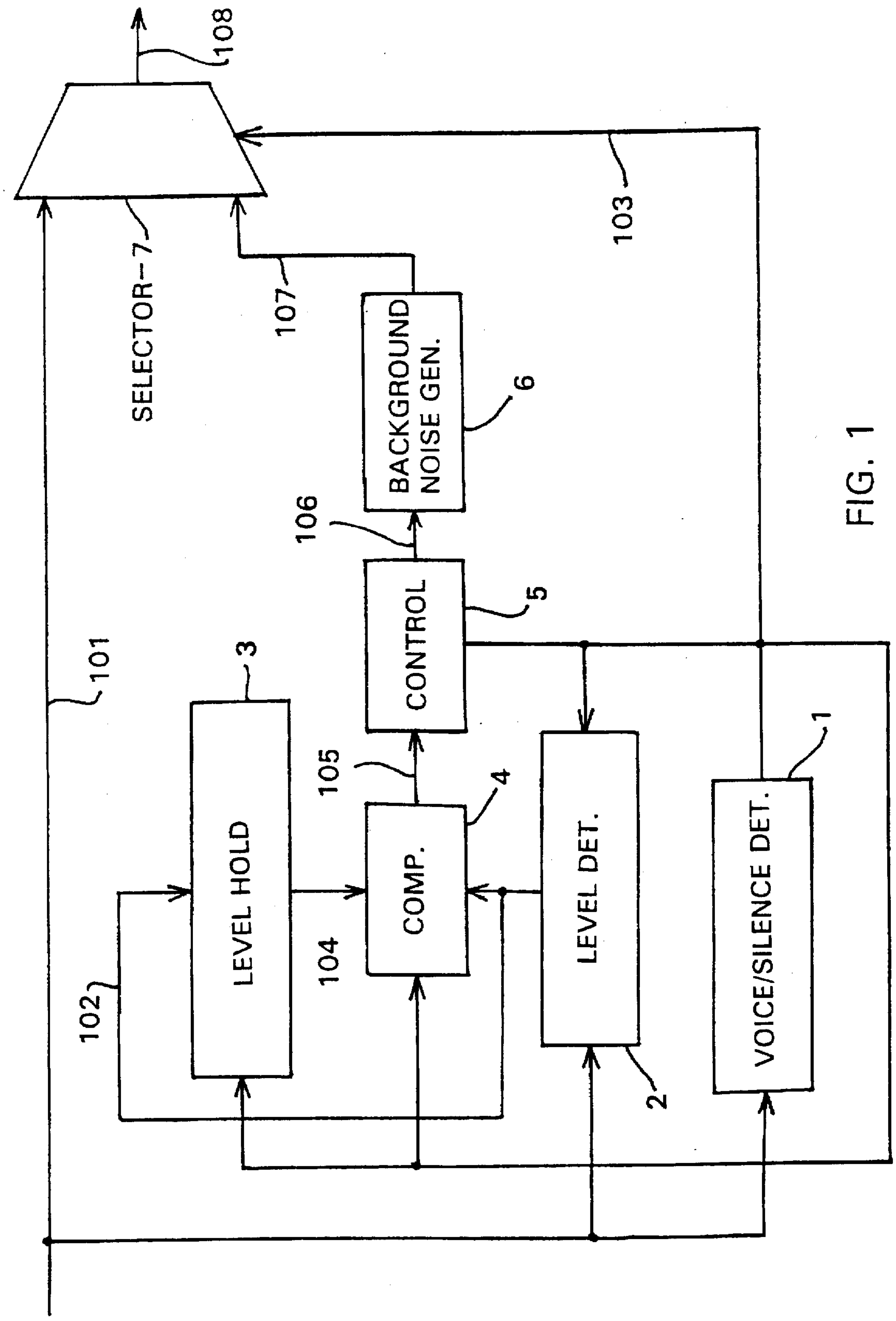
FIG. 1 is a block diagram showing the configuration of an embodiment of this invention.
Figure 3:
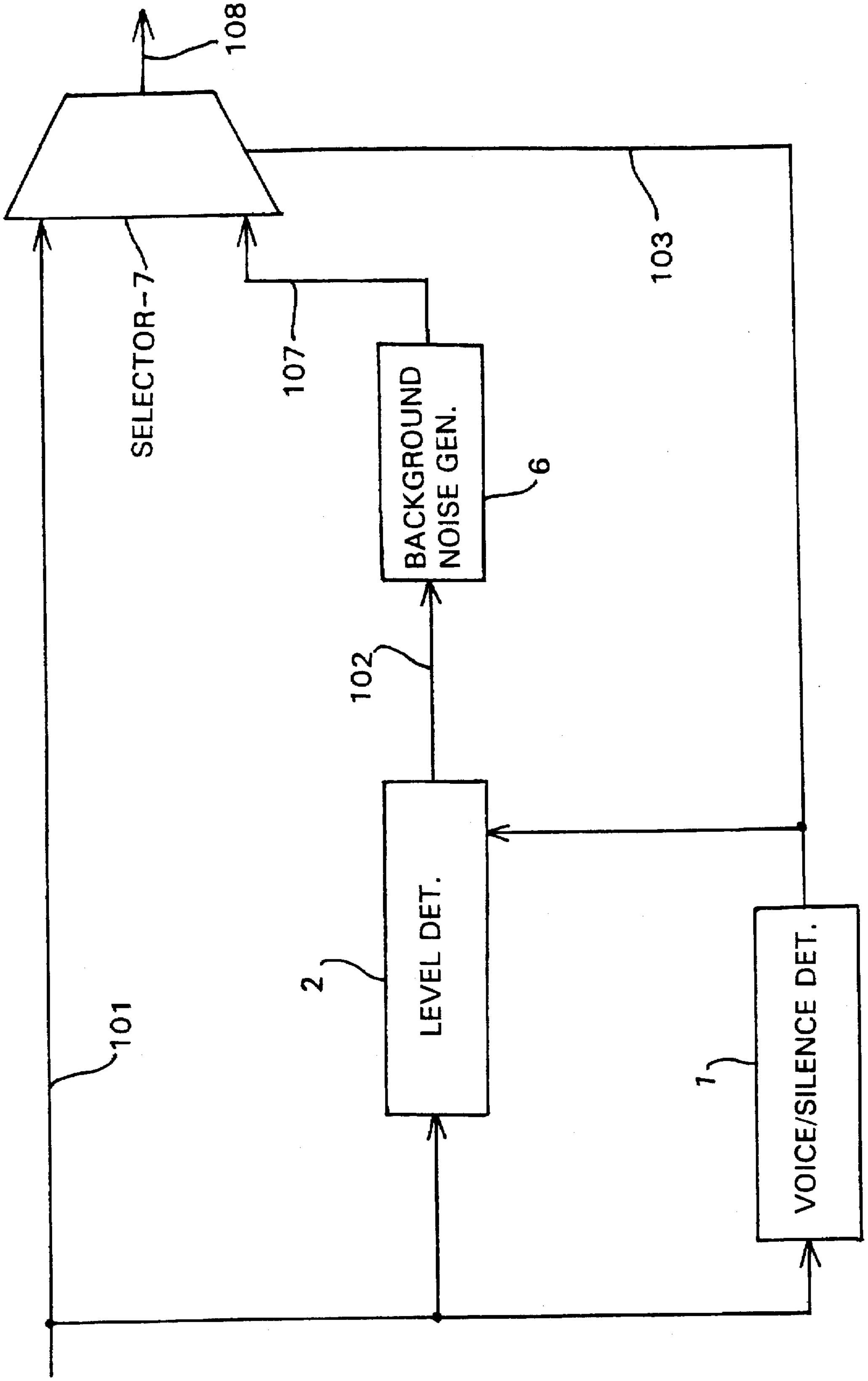
FIG. 3 PRIOR ART
FIG. 3 is a block diagram showing the configuration of the prior art.

Referring now to FIG. 1, there is shown a block diagram indicative of an embodiment of this invention, in which the same constituents as those shown in FIG. 3 are denoted by the same reference numerals.

The circuit as shown in FIG. 1 includes a voice/silence detection circuit 1 which receives a speech signal 101 and detects whether it is in a voiced or a voiceless state. The signal 101 is further supplied to a signal level detection circuit 2 which detects the signal level of the speech signal 101 at specified timings and produces a detection signal 102 thereof. This signal 102 is supplied to a holding circuit 3 and temporarily held therein until the circuit 2 operates at the next sampling timing. There are further provided a comparator circuit 4, a control circuit 5, a background noise generating circuit 6, and a selector 7.

In operation, the speech signal 101 is supplied in common to the voice/silence detection circuit 1, the signal level detection circuit 2, and the selector 7. The circuit 1 observes the conditions of the received speech signal 101, and outputs a voice/silence decision signal 103 which is at a high level (high potential) when the received speech signal is voiced and is at a low level (low potential) when it is voiceless. This signal 103 is supplied to the signal level detection circuit 2, the control circuit 5, and the selector 7.

As described in conjunction with the prior art, the signal level detection circuit 2 detects the signal level of the received speech signal 101 at the update timing of the background noise level where the signal 103 makes a transition from the high level to the low level, and outputs the detected level signal 102 which is proportional to the signal level. The detected level signal 102 is in turn supplied to the preceding detected level holding circuit 3 and the comparator circuit 4.

The holding circuit 3 fetches and thus temporarily holds the detected level signal 102 every background noise level update timing, and outputs the previously-held level signal as a preceding detected level signal 104 which is in turn supplied to the comparator circuit 4. The comparator circuit 4 detects the level variation by comparing the magnitude of the detected level signal 102 and the preceding detected level signal 104 at every background noise level update timing to output the variation (difference value) as a variation signal 105. This signal 105 is then input to the control circuit 5. The signal 105 thus represents a difference between n-th detected signal and (n-l)th detected signal.

The control circuit 5 responds to signal 105 and controls its output signal 106 such that the background noise level signal 106, which has been produced in response to the previous ((n-l)th) operation, is raised or lowered by a predetermined specified amount, or not changed. This noise level signal 106. Thus controlled in then supplied to the background noise generating circuit 6, in which an internal background noise signal 107 proportional to the magnitude of the background noise level signal 106 is generated and supplied to the selector 7. This selector 7 selects the received speech signal 101 when the voice/silence detection signal 103 is at the high level (namely, when it is voiced) and selects the internal background noise 107 When the signal 103 is at the low level (namely, when it is voiceless), and outputs the selected one as an output signal 108.

Figure 2:
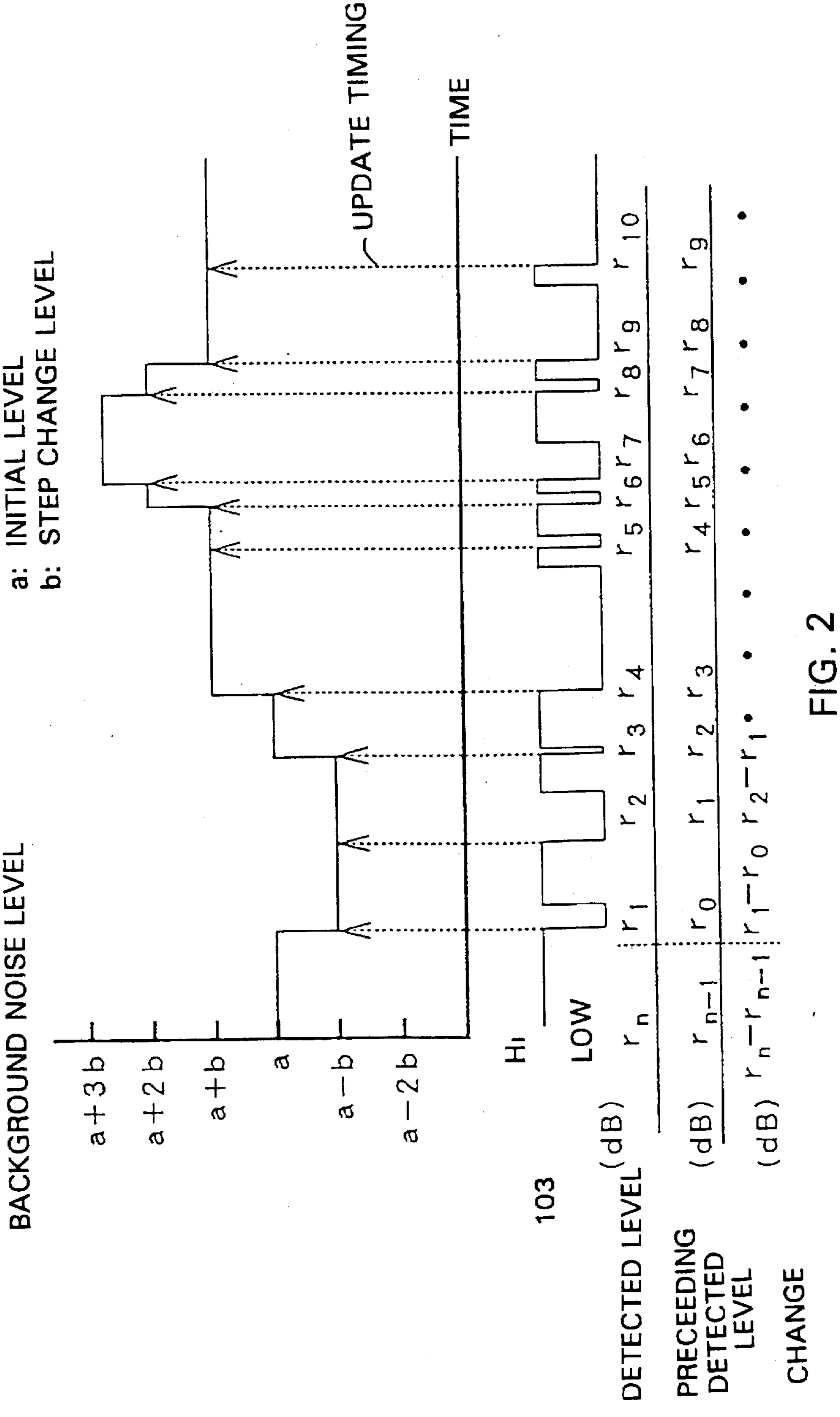
FIG. 2 is a diagram for describing an example of changes in the level of the background noise.

Referring to FIG. 2, the above operation of this embodiment will be described below in more detail. FIG. 2 shows a timing chart which represents an example of the changing situation versus the time axis, of the background noise level signal 106 which is the output of the control circuit 5, and the changing process of the voice/silence detection signal 103 corresponding to the time axis is also shown in the figure.

In addition, the pair (combination) of the detected level signal 102 ($r_n$) and the preceding detected level signal 104 ($r_{n-l}$) at every background noise level update timing (shown by the broken line in the figure) where the voice/silence signal 103 makes a transition from the high level to the low level is shown in time sequence in FIG. 2. In FIG. 2, the suffix n of the detected level signal $r_n$ corresponds to the number of times of occurrence of the background noise level update timing is called $r_n$ and background noise.

When the detected level signal 102 at the n-th background noise level update timing is called $r_n$ and the preceding detected level signal 104 output from the preceding detected level holding circuit 3 is called $r_{n-l}$, the variation signal 105 output from the comparator circuit 4 is represented in FIG. 2 as the level variation $r_n$-$r_{n-l}$.

When the level variation $r_n$-$r_{n-l}$ is smaller than a minimum value $r_{min}$ specified in advance (namely, when $r_{min}>r_n-r_{n-l}$), the control circuit 5 outputs the signal obtained by lowering the level of the preceding ((n-l)th) background noise level by a predetermined specified level value b as the present (n-th) background noise level signal 106. This signal 106 is held by the control circuit 5 until the next background noise level update timing.

When the level variation $r_n-r_{n-1}$ falls within the range between predetermined minimum value $r_{min}$ and maximum value $r_{max}$ (namely, when $r_{min}\leq r_n-r_{n-1}\leq r_{max}$), the control circuit 5 holds the level of the present (n-th) background noise level signal 106 at the same level as that of the preceding ((n-l)th) background noise level signal.

Furthermore, when the level variation $r_n-r_{n-1}$ is larger than the predetermined maximum value $r_{max}$ (namely, when $r_{max}<r_n-r_{n-1}$), the control circuit 5 outputs the signal obtained by raising the level of the preceding ((n-l)th) background noise level signal by the predetermined specified level b as the present (n-th) background noise level signal 106. It should be noted that the maximum value $r_{max}$ and the minimum value $r_{min}$ may be set to be variable (provided that $r_{min}<r_{max}$).

As described in the above, based on the level variation $r_n-r_{n-1}$, the control circuit 5 determines the level of the present (n-th) background noise signal 106 so as to be changed from that of the preceding ((n-l)th) background level signal by one step unit (±b) at the most, and holds the value until the next background noise level update timing. Therefore, even when the detected level signal 102 undergoes a sudden change due to generation of an impulse noise at a time of signal level detection, the change in the background noise level signal 106 is positively confined within a specified range. In other words, as shown in FIG. 2, the background noise level signal 106 undergoes a change of a maximum of one step unit based on the level variation $r_n-r_{n-1}$, so that there will not be output a signal with large level change and steep gradient, proportional to an impulse noise or the like, and the background noise level signal 106 will follow slowly the changes in the detected level signal 102.

Therefore, the level of the internal background noise signal 107 will not undergo a sudden change even when an impulse noise is generated at an updating time of the background noise level during regeneration of a background noise on the receiver side, so that this embodiment is capable of generating a natural background noise free from incongruous aural sensation.

As described in the above, the level of the background noise undergoes a change only within a specified range, without a sudden change, even when an impulse noise is generated at an updating time of the background noise during regeneration of a background noise on the receiver side. Therefore, this invention exhibits an effect that it can generate a background noise free from incongruous aural sensation.

According to this invention, the device is controlled such that it selects either one of the signal obtained, by adding or subtracting a predetermined specified level value to or from, or by holding the level at the same value as, the background noise output at one sampling period earlier. Therefore, even when there is generated an impulse noise at a signal detection time, the signal level is changed from the background noise level at one sampling period earlier by one step portion at the most, so that it is possible to generate a background noise which has no sudden change and is free from incongruous aural sensation.

Moreover, according to this invention, it is possible to suppress an impulse noise or the like to be output as a background noise, and generate a natural background noise free from incongruous aural sensation by a simple constitution of adding a preceding detected level holding circuit, a comparator circuit which outputs the variation in the detected level signal, and a control circuit which updates the background noise level at every background noise level update timing.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A receiving circuit comprising voice/silence detection means for detecting whether an input signal is voiced or voiceless, signal level detection means for detecting a signal level of said input signal, background noise outputting means for outputting a background noise signal, selection means for selecting and outputting said input signal during a voiced period and said background noise signal during a voiceless period, holding means for temporarily holding an output signal from said signal level detection means, and comparison means for comparing an output signal currently produced by said signal level detection means with an output signal from said holding means, said background noise outputting means outputting said background noise signal in response to an output of said comparison means.

2. The receiving circuit as claimed in claim 1, wherein said background noise outputting means controls, in response to the output of said comparison means, said background noise signal such that a change in said background noise signal from a previous level to a current level is suppressed below a predetermined level.

3. The receiving circuit as claimed in claim 1, wherein said background noise outputting means outputs said background noise signal such that said background noise signal has no change the output of said comparison means is in a first state, has a positive change when the output of said comparison means is in a second state, and has a negative change when the output of said comparison means is in a third state.

4. The receiving circuit as claimed in claim 1, wherein said holding means holds the output signal from said signal level detection means at timing when said voice/silence detection means represents a transition in said input signal from a voiced state to a voiceless state.

* * * * *